United States Patent [19]

Carlsen

[11] Patent Number: 4,854,844
[45] Date of Patent: Aug. 8, 1989

[54] DIE-LIP ADJUSTING MECHANISM
[75] Inventor: Richard A. Carlsen, Somerset, N.J.
[73] Assignee: John Brown, Inc., Warwick, R.I.
[21] Appl. No.: 213,450
[22] Filed: Jun. 29, 1988

Related U.S. Application Data

[63] Continuation of Ser. No. 844,713, Mar. 27, 1986, abandoned.

[51] Int. Cl.$^4$ ............................................. B29C 47/16
[52] U.S. Cl. .................................... 425/141; 264/40.1;
264/40.5; 411/263; 411/305; 411/437; 425/381;
425/466
[58] Field of Search .................. 425/141, 172, 192 R,
425/381, 466, 150; 264/40.1, 40.5;
411/277–279, 305, 306, 263, 366, 383, 437

[56] References Cited

U.S. PATENT DOCUMENTS

| | | | |
|---|---|---|---|
| 575,109 | 1/1897 | Gulick | 411/305 |
| 980,034 | 12/1910 | Watrous | 411/279 |
| 1,957,784 | 5/1934 | Johnson | 411/263 |
| 2,387,718 | 10/1945 | Coleman | 425/466 |
| 3,039,143 | 6/1962 | Nicholson | 425/466 |
| 3,261,893 | 7/1966 | George et al. | 425/141 |
| 3,777,356 | 12/1973 | Hemingway | 411/306 |
| 4,033,394 | 7/1977 | Capuano | 411/278 |
| 4,454,084 | 6/1984 | Smith et al. | 264/40.1 |
| 4,507,073 | 3/1985 | Shelton | 425/141 |
| 4,512,943 | 4/1985 | Hahn et al. | 264/40.6 |
| 4,514,348 | 4/1985 | Iguchi et al. | 425/141 |

Primary Examiner—James Housel
Attorney, Agent, or Firm—Weingram & Zall

[57] ABSTRACT

A differential screw adjusting mechanism comprised of an externally and internally threaded adjusting nut which has a plurality of slots formed along its length. The internal threads of the adjusting nut cooperatively and threadedly engage screw threads at the end of each of the expansion rods. The rods are in turn fixed to the lip of the die via set screws or jam nuts. A spool having an internally threaded diameter and a slot along its length is engaged to the external threads of the adjusting nut. The head of the spool has a flattened portion to limit rotation of the spool when clamped in place. Thus, the slotted adjusting nut is overfit with the slotted spool. The entire assembly of spool, nut, and rod is clamped in place via a clamping arrangement affixed to the die. The tightening of the clamp serves to close the spool via the slot over the nut, and in turn, the nut, via its slots, over the rod. A second clamp mounted on the first clamp abuts against the flattened portion of the head of the spool to limit rotation of each spool and resist reactive axial forces acting on the spool.

5 Claims, 3 Drawing Sheets

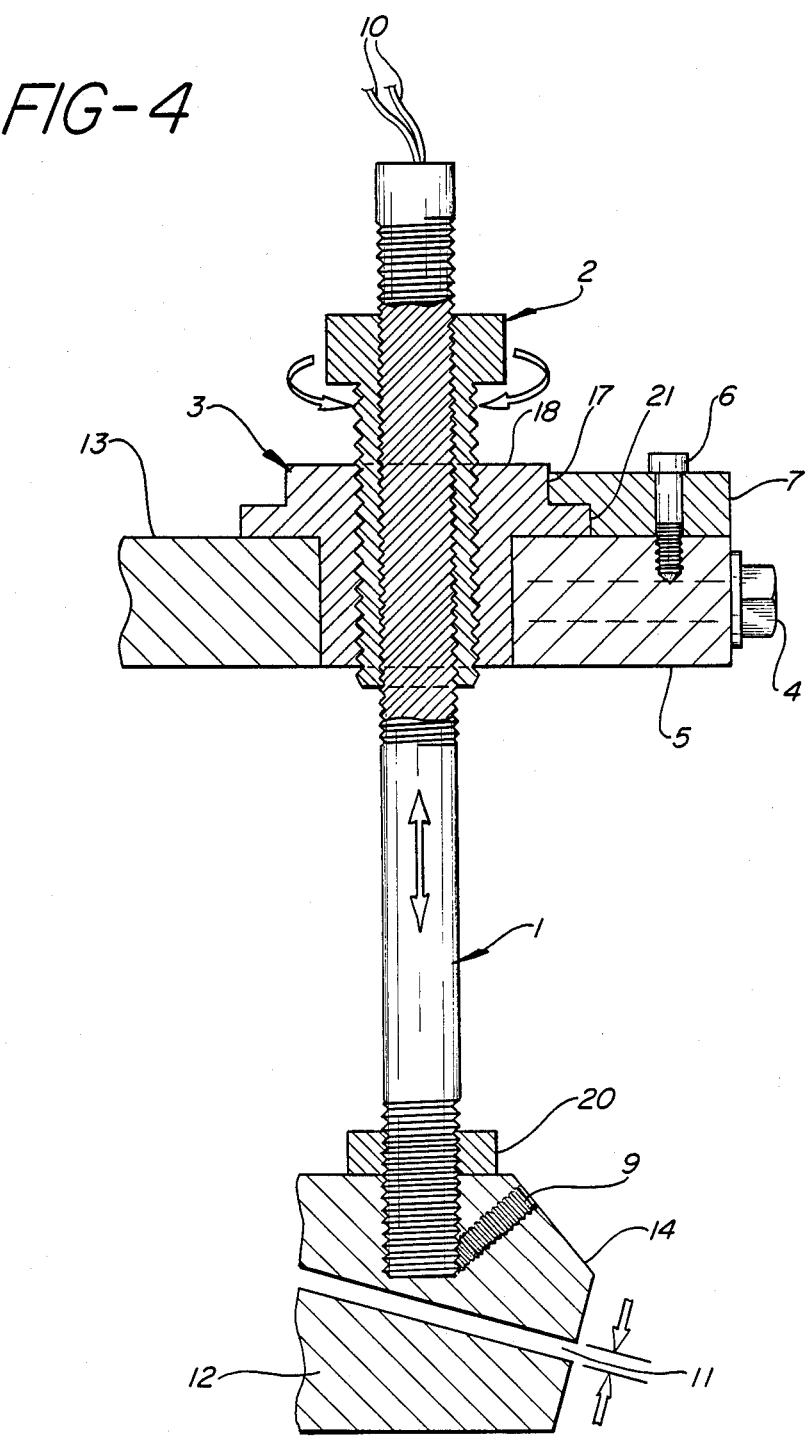

DIE-LIP ADJUSTING MECHANISM

This is a continuation of co-pending application Ser. No. 844,713 filed on Mar. 27, 1986, now abandoned.

BACKGROUND OF THE INVENTION

1. Field of the Invention

The present invention relates to improvements in web manufacturing dies and specifically to a modification in the mechanism which is utilized to shape the control aperture for the thickness of the web. The invention is useful when thermal expansion rods are employed in the die to control web thickness.

2. Description of the Prior Art

Shelton U.S. Pat. No. 4,507,073 discloses web manufacturing apparatus in which a flexible shaping member engages fluid material from which a web is formed. A support extending parallel to the shaping member and a plurality of thermal expansion rods extending between the shaping member and the support are disclosed. The use of the thermal expansion rods and the support is such that the shaping member is flexed to control the web thickness profile by means of electrical heaters on the thermal expansion rods.

Each thermal expansion rod is fixed to the shaping member and is secured to the support via a differential screw mechanism that includes a driven screw and an adjusting screw positioned in tandem in a threaded bore through the support. The driven screw can be turned by turning the adjusting screw. The driven and adjusting screws have internally threaded bores and one end of the thermal expansion rod screws into the bore of the driven screw. A jam screw is screwed into the bore of the adjusting screw to be screwed down against the end of the thermal expansion rod within the differential screw mechanism.

Iguchi, et al U.S. Pat. No. 4,514,348 discloses an automatic system which measures the thickness of the web outputted from the die; compares the measured thickness with a predetermined thickness, and automatically tightens adjusting screws to maintain the desired thickness. Rough adjustment is effected by tightening or loosening the adjusting screws while fine adjustment is achieved by heating the tension bolts both under automatic control.

As is known from the above prior art, in the manufacture of webs of plastic material it is necessary to provide control of the thickness of the web across its width. Where the web is formed from fluid material, this control can be accomplished by providing the machine that makes the web with an elongated shaping member that engages the web material at a location in the machine at which the material is in a plastic state and flexing the shaping member along its length which is traverse to the direction of movement of the web material, to profile one side of the material in a way that will cause the completed web to have a constant thickness throughout.

The flexing of the shaping member is affected by a series of rod-like devices exerting force which devices are arranged in a line down the length of the shaping member and the forces exerted by these devices on the shaping member are controlled by, for example, a computer receiving signals from web thickness sensors positioned to determine the thickness of a completed web.

Another type of force exerting means to effect the flexing the shaping member is a thermal expansion rod which is a rod equipped with a heating element. Portions of the rod can be caused to expand by varying amounts to adjust the force the rod exerts on the objects engaged by the rod. One end of the rod is fixed and the other end bears against the shaping member so that the flexing of the shaping member can be controlled by the rate at which electrical energy is supplied to the heating elements on the rods. Since the power supplied to each heating element can be precisely controlled, the thermal expansion rods offer a capability for precise control of the shape of the shaping member and the control, is in turn, utilized to precisely control the thickness of the web across its width. An example of such an apparatus is shown in the U.S. Patent to Smith et al, U.S. Pat. No. 4,454,084, issued June 12, 1884.

While the above use of electrically stimulated expansion rods has shown substantial merit theoretically, its full potential practically has not been realized, due mainly to the problems associated with the mechanical adjustments and settings of the rods. These adjustments and settings are less precise than the control which is achievable by computer and selective electrical heating. These mechanical limitations arise from the courseness of the mechanical adjustment and by the fact that a large number of rods are utilized. The practicality of sensitive computer control with a large number of rods in the presence of course mechanical adjustment is such that the errors inherent in the mechanical set up are much greater than the accuracies theoretically obtainable from the computer-controlled electrical heating system.

SUMMARY OF THE INVENTION

The present invention solves the problems of thermal expansion rod control of the configuration of the shaping member of a web manufacturing machine by providing modifications to the standard differential threaded die lip adjusting bolt assembly. The modifications result in elimination of inherent backlash in the adjusting assembly when the rod or bolt shifts from a pulling mode to a pushing mode. The modification is particularly advantageous when incorporated with temperature controlled die gap adjusting studs or bolts. The modification allows the differential thread adjusting nut to be turned to provide a lip gap adjustment without undoing or loosening any type of nut locking device.

In this manner, a precise adjustment can be obtained without the necessity of adjusting any other parts which could cause further, larger changes in the positioning of the shaping member.

To these ends, the differential screw of the present invention is comprised of an externally and internally threaded adjusting nut which has a plurality of slots formed along its length. The internal threads of the adjusting nut cooperatively and threadedly engage screw threads at the end of each of the expansion rods. The rods are in turn fixed to the lip of the die via set screws or jam nuts. A spool having an internally threaded diameter and a slot completely along its length is engaged to the external threads of the adjusting nut. The head of the spool has a flattened portion to limit rotation of the spool when clamped in place. Thus, the slotted adjusting nut is overfit with the slotted spool. The entire assembly of spool, nut, and rod is clamped in place via a clamping arrangement affixed to the die. The tightening of the clamp serves to close the spool via the slot over the nut, and in turn, the nut, via its slots, over the rod. A second clamp mounted on the first clamp abuts against the flattened portion of the head of the spool to limit rotation of each spool and resist reactive axial forces acting on the spool.

This dual clamping causes contraction of the spool on the nut and on the rod such that adjustment of the rod is accomplished simply by rotating the head of the adjustment nut. Since all the elements of the differential screw have the same axial positions, the rod is advanced by just the amount selected.

Accordingly, it is an object of the present invention to provide a differential adjusting apparatus to enable precise control of the thickness of the web produced in web manufacturing machines.

It is a further object of the present invention to provide a differential adjusting apparatus for web manufacturing machines that is free of back lash and capable of precise adjustment.

Another object of the present invention is to provide a differential adjusting apparatus for web manufacturing machines which is capable of coacting with termal expansion rods to modulate the setting of the thermal expansion rods in two directions extending axially along the termal expansion rods.

A further object of the present invention is to provide a differential adjusting apparatus for web manufacturing machines which can precisely and accurately push or pull the shaping member of the apparatus to the desired thickness of the web to be produced.

A further object of the present invention is to provide a differential adjusting apparatus for web manufacturing machines which is relatively simple to manufacture.

A further object of the present invention is to provide a differential adjusting apparatus for web manufacturing machines which is relatively economical to produce.

A further object of the present invention is to provide a differential adjusting apparatus for web manufacturing machines which is reliable in operation.

A further object of the present invention is to provide a differential adjusting apparatus for web manufacturing machines which cannot be accidently moved from its adjustment point.

A further object of the present invention is to provide a differential adjusting apparatus for web manufacturing machines which is resistant to variation in setting due to shock or vibration.

A further object of the present invention is to provide a differential adjusting apparatus for web manufacturing machines which does not require any locking mechanism to insure that it accurately maintains its position.

These as well as further objects and advantages of the present invention will become apparent to those skilled in the art from a review of the detailed specification reference being made to the accompanying drawings in which:

BRIEF DESCRIPTION OF THE DRAWINGS

FIG. 4 is a cross-section showing the various elements of the apparatus and schematic form in operative coation.

DESCRIPTION OF THE PREFERRED EMBODIMENT

Figure 1:
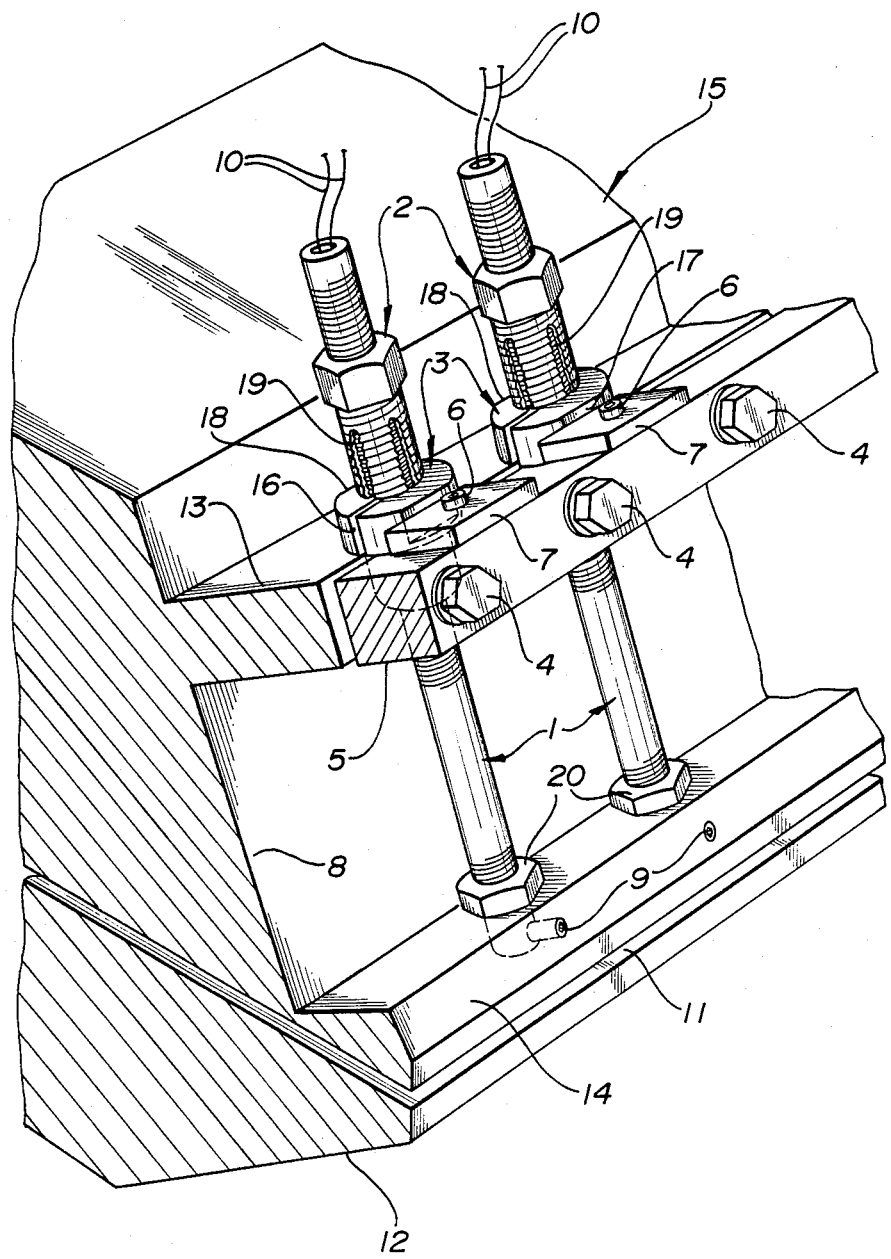
FIG. 1 is a perspective view of the preferred embodiment of the web manufacturing apparatus constructed in accordance with the present invention.

Referring now to the drawings, specifically FIG. 1 thereof, a die 15 has an aperture 11 from which there is drawn a web of plastic material in the manner well known in the art. The aperture 11 is formed between lip portions 12 and 14 of die 15. In the embodiment of FIG. 1, the lip portion 14 of the die 15 is adjustable throughout its length and is the member which controls the thickness of the web. Lip portion 12 is fixed.

The thickness control is provided by adjusting studs 1 which are connected between the lip portion 14 and fixed bracket arm 13. A plurality of studs are shown. The studs are affixed to the lip portion 14 be set screws 9 and/or jam nuts 20 at the base of each adjusting stud.

As known in the prior art, the studs 1 are heated via electric heaters. Each of the studs 1 has electrical power fed via conductors 10 to a cartridge heater within the stud, not shown, and are thus caused to expand or contract by application of power tvpically under control of a computer, not shown.

The studs are each threaded into an adjusting nut 2 which in turn is threaded into a spool 3 and the assembly is secured by a clamp bar 5 and the shoulder portion 13 of the die via screws of bolts 4. Bar 5 has a plurality of additional or secondary clamps 7 mounted thereon, one clamp for each stud 1. The clamps 7 are affixed to bar 5 via bolts 6. As can now be seen, the bar 5 is tightened down over stud 1 to hold same in place. As will be further explained, clamp 7 is affixed over a flattened portion of spool 3 in the adjusting mechanism of the invention to prevent rotation of same.

Figure 3:
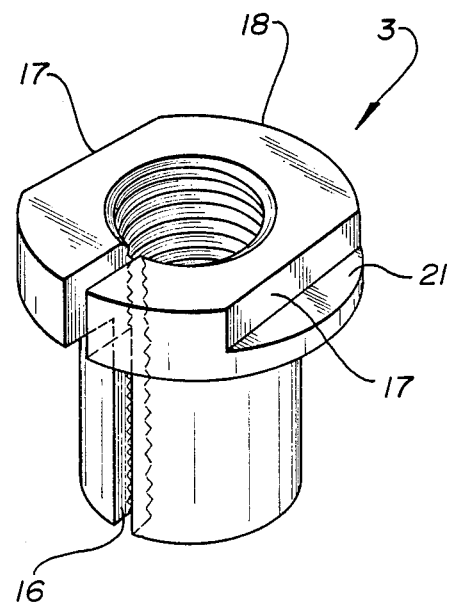
FIG. 3 is a perspective of the other portion of the adjusting nut employed with the invention.

As shown in FIGS. 1 and 3, spool 3 having internal threads and a slot 16 is threadedly engaged with one end of each of the rods or studs 1. This spool 3 is shown in more detail in FIG. 3 as having slot 16 along one entire side of the spool and two flattened portions 17 formed on opposite sides of the head 18 of spool 3. In FIGS. 1 and 3, the flattened portion 17 is seen to cooperate with clamp 7 whereby the engagement of the flattened portion 17 with the clamp will prevent the spool 3 from rotating.

As seen in FIG. 4, the clamp 7 has an L shape to accommodate for the stepped portion 21 of the spool 3 adjacent the flattened portion 17. The coaction of the end of the clamp with the stepped portion ensures that the spool will resist any reactive forces tending to raise the spool and/or the adjusting studs 1 axially.

Additionally, it is necessary for two flat sections to be formed on the spool so that the spool engagement with the adjusting nut can be varied to provide proper registration of the members of the adjusting mechanism as will be described below.

Figure 2:
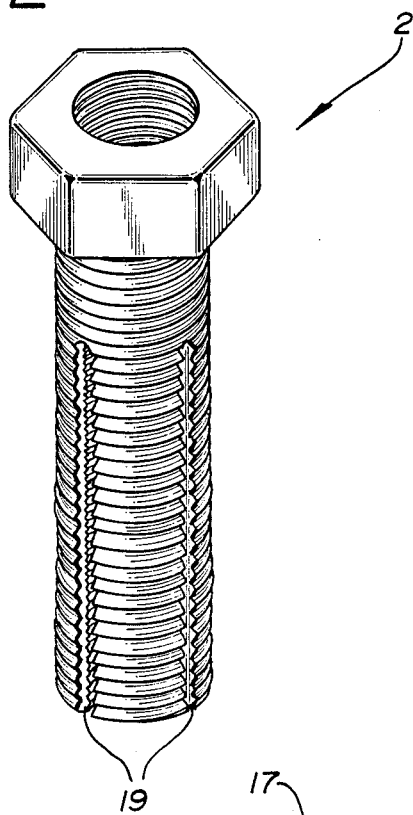
FIG. 2 is a perspective view of a portion of the adjusting nut employed in the invention.

An adjusting nut 2 is threadedly engaged within the internal threads of spool 3. As shown in more detail in Figs. 2 and 4, the nut 2 has a plurality of slots 19 formed therein. None of the slots 19 are cut for the full length of the nut but are cut for approximately three-quarters of the length of the nut. The adjusting nut 2 has both external and internal threads formed thereon. As indicated above, the external threads of nut 2 are threadedly engaged with the internal threads of spool 3.

The adjusting studs 1 coacting with the adjusting nut 2 and spool 3 are used to adjust the gap 11 between the lips 12 and 14 of the die. Die lip 14 is rigidly attached to the end of adjusting stud 1 by the set screws 9 and/or jam nuts 20. The spool 3 is held rigid with respect to bracket arm 13 which is rigid whereas die lip 14 is movable. Therefore, movement of the adjusting stud relative to bracket arm 13 will move die lip 14 to adjust the gap of the die.

The movement of the adjusting stud 1 is controlled by means of the differential thread adjustment apparatus which consists primarily of adjusting stud 1 and adjusting nut 2 coacting with spool 3. Adjusting nut 2 has internal threads which mate with the external threads of the adjusting studs and has external threads which mate with the internal threads of spool 3. The adjusting stud will move relative to the stationary spool in relation to the difference in the thread pitch between the internal and external threads on the adjusting nut or alternatively the difference between the thread pitch of the adjusting stud and the spool. When the pitch of the spool is less than the pitch of the adjusting stud, as for example, 12 threads to the inch for the spool versus 13 threads to the inch for the adjusting stud, then tightening down the adjusting nut twelve turns will require that the adjusting stud move 1/13 of an inch downward so that it remain in the same relative position vis-a-vis the adjusting nut as the adjusting nut has moved with respect to the spool. Therefore, there is a differential of 1/13 of an inch movement inward or downward by movement of the adjusting nut one inch downward with the ratios mentioned. Should the pitches be reversed so that the greater pitch is on the spool and the lesser is on the adjusting stud, then the adjusting stud would be backed off as the adjusting nut is moved down on the stud.

The spool 3 is restrained from motion by clamp 7 which is in turn secured by bolts 6. The spool clamping bar 5 is secured to the body 8 of the die via the screws 4. The tightening of screws 4 eliminate clearances between the spool 3, the adjusting nut 2, and the stud 1. The clamping action of clamping bar 5 is effectuated by the slot 16 in spool 3 and the slots 19 in adjusting nut 2. The slot 16 preferably extends the length of spool 3 and is positioned intermediate the flats on the head 17 of the spool so that the slot will be parallel to the space between the clamping bar 5 and the bracket arm 13. The multiple slots 19 in the adjusting nut preferably extend partially up the length of the nut to be in registration with the length of the spool when in operative position. Tightening of screws 4 will increase the clamping action of the spool and the adjusting nut. The slots 16 on the spool and 19 on the adjusting nuts will allow for deformation of the spool and the adjusting nut so that these parts will fit snugly together and also the adjusting nut will fit snugly to the adjusting stud. The tight fit will minimize or eliminate any backlash between the elements.

As modifications to the foregoing may be made without departing from the scope or spirit thereof, it is intended that the foregoing specification be regarded as illustrative and not as limiting.

What is claimed as new and is desired to be covered by the United States Letters Patent is set forth in the accompanying claims:

1. A web manufacturing die comprising:
   an elongated shaping member for controlling the thickness of the web which is formed along the length of said shaping member;
   an elongated support extending parallel to the shaping member;
   a plurality of thermal expansion rods mounted on the support and extending into the shaping member;
   a plurality of mechanisms for adjustably mounting each of said rods in said support;
   each said mechanism supported by said support and including a threaded spool having threads internally formed therein and a slot extending along the length of the spool;
   an adjusting nut having internal and external threads formed therein;
   the external threads of said adjusting nut engaging the internal threads of the spool;
   the internal threads of said adjusting nut engaging said rod;
   said adjusting nut having a plurality of slots formed therein; and
   adjustable means mounted on said support adjacent to said spool for compressing said spool about said rod.

2. For use in a die for generating a web of plastic material, said die having an elongated aperture, the width of the aperture defining the thickness of the plastic material, said aperture being formed of a fixed lip portion and a movable lip portion; a mechanism connectable to said movable lip portion for shaping said movable lip portion, said shaping mechanism comprising:
   at least one rod anchorable in said movable lip portion and connectable to a support spaced from said movable lip, said rods being electrically heated to expand and contract the rods in said adjustable support thereby shaping said movable lip portion;
   differential screw means coupled to each of said rods for mounting the rods in said support so that said rods can be adjusted mechanically;
   each said differential screw means comprising:
   a spool having internal threads formed thereon and a slot formed along the length thereof;
   an adjusting nut having internal and external threads formed thereon;
   said adjusting nut overfitting one end of each of said rods and the exterior threads thereof cooperatively engaging the interior threads of said spool;
   said spool having a flattened head portion and a radially extending stepped portion;
   clamping means connected to said support for clamping and preventing rotation and axial movement of the spool relative to said support by fixedly engaging said flattened portion and said radially extending stepped portion; and
   means adjacent to said spoort for compressing said spool about said rod.

3. In a web-forming die having an aperture therein, said aperture being shaped by a plurality of rods mounted between said aperture and a support, the improvement which comprises means for mechanically mounting one end of each of said rods in said support, each said means being supported by said support and including:
   a slotted spool having an external flattened portion and internal threads formed thereon;
   an adjusting nut having internal and external threads formed thereon, the internal threads of said adjusting nut engaging said rod and the external threads of said adjusting nut cooperatively engaging the internal threads of said spool; and
   clamping and compression means adjacent to said spool for tightening said spool along said slot and about said rod and for limiting rotations of said spool, said means including a flattened surface portion pressing against the corresponding flattened portion of said spool.

4. The apparatus of claim 3 wherein said adjusting nut includes a plurality of slots formed therein whereby said adjusting nut is compressed by said spool about said rod to limit backlash in the screw threads.

5. A web forming die having an adjustable lip portion defining the thickness of the web and a support portion spaced from the adjustable lip portion, said adjustment being provided by a plurality of thermally-responsive rods, a plurality of means for mounting said rods in support portion, each said means being supported by said support and comprising comprising:

a nut having an internally-threaded bore, said bore cooperating with corresponding threads on each of said rods;

said nut having an externally threaded portion, said internally threaded bore and external threaded portion being slotted by a plurality of slots;

a spool having a body portion and a flattened head portion, the body portion of said spool having internal threads formed therein, said body portion being slotted along the entire length of said spool for being compressed, the internal threads of said spool cooperating with the external threads of said nut;

compression means mounted to said support portion for compressing said spool about said rod; and means mounted to the support and clamped against said flattened head portion for preventing rotation of said spool relative to said support.

* * * * *